(12) United States Patent
Mizuno et al.

(10) Patent No.: US 9,661,284 B2
(45) Date of Patent: May 23, 2017

(54) SOLID STATE IMAGING APPARATUS AND IMAGING METHOD

(71) Applicant: OLYMPUS CORPORATION, Hachioji-shi, Tokyo (JP)

(72) Inventors: Kyosuke Mizuno, Hino (JP); Hitoshi Komine, Hachioji (JP); Yutaka Fujisawa, Akishima (JP); Takehide Fujimoto, Nishitama-gun (JP); Hideki Kato, Kokubunji (JP); Sadaaki Tomura, Kawaguchi (JP); Nanako Ubayama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/212,829

(22) Filed: Jul. 18, 2016

(65) Prior Publication Data

US 2016/0330415 A1 Nov. 10, 2016

Related U.S. Application Data

(63) Continuation of application No. PCT/JP2015/066517, filed on Jun. 8, 2015.

(30) Foreign Application Priority Data

Jun. 13, 2014 (JP) ................................ 2014-122618

(51) Int. Cl.
*H04N 9/04* (2006.01)
*H04N 5/77* (2006.01)
(Continued)

(52) U.S. Cl.
CPC ......... *H04N 9/045* (2013.01); *G02B 23/2484* (2013.01); *H04N 5/2351* (2013.01);
(Continued)

(58) Field of Classification Search
CPC ........ H04N 9/045; H04N 5/77; H04N 5/2351; H04N 5/772; H04N 5/343; H04N 9/09; G02B 23/2484

See application file for complete search history.

(56) References Cited

U.S. PATENT DOCUMENTS

2014/0232901 A1* 8/2014 Furuta .................... H04N 9/045
348/223.1
2015/0288903 A1* 10/2015 Oshima .................. H04N 5/378
348/301

FOREIGN PATENT DOCUMENTS

JP H06-70256 A 3/1994
JP H10-243919 A 9/1998
(Continued)

OTHER PUBLICATIONS

Dec. 22, 2016 Notification of Transmittal of Translation of IPRP Written Opinion issued in PCT/JP2015/066517.

(Continued)

*Primary Examiner* — Gevell Selby
(74) *Attorney, Agent, or Firm* — Oliff PLC

(57) ABSTRACT

A solid-state imaging apparatus includes an imaging unit that images a subject to generate a plurality of pieces of image data having information corresponding to different types of color components at same pixel positions, an operation mode setting unit that sets an operation mode of the imaging unit, a thinning rate setting unit that sets a thinning rate relative to each of the plurality of pieces of image data of the different types of color components in accordance with the operation mode, a thinning processor that performs thinning processing relative to each of the plurality of pieces of image data of the different types of color components generated by the imaging unit in accordance with the thinning rate, and a transmission unit that (Continued)

transmits the plurality of pieces of image data of different types of color components subjected to the thinning processing.

7 Claims, 11 Drawing Sheets

(51) Int. Cl.
G02B 23/24 (2006.01)
H04N 5/235 (2006.01)
H04N 5/343 (2011.01)
H04N 9/09 (2006.01)

(52) U.S. Cl.
CPC ............... *H04N 5/343* (2013.01); *H04N 5/77* (2013.01); *H04N 5/772* (2013.01); *H04N 9/09* (2013.01)

(56) References Cited

FOREIGN PATENT DOCUMENTS

| JP | 2002-209838 A | 7/2002 |
|----|---------------|--------|
| JP | 2012-129927 A | 7/2012 |
| JP | 2013-094269 A | 5/2013 |
| JP | 2013-111177 A | 6/2013 |
| WO | 2013/069691 A1 | 5/2013 |

OTHER PUBLICATIONS

Jul. 21, 2015 International Search Report issued in Patent Application No. PCT/JP015/066517.

Jan. 19, 2016 Office Action issued in Patent Application No. 2015-558249.

\* cited by examiner

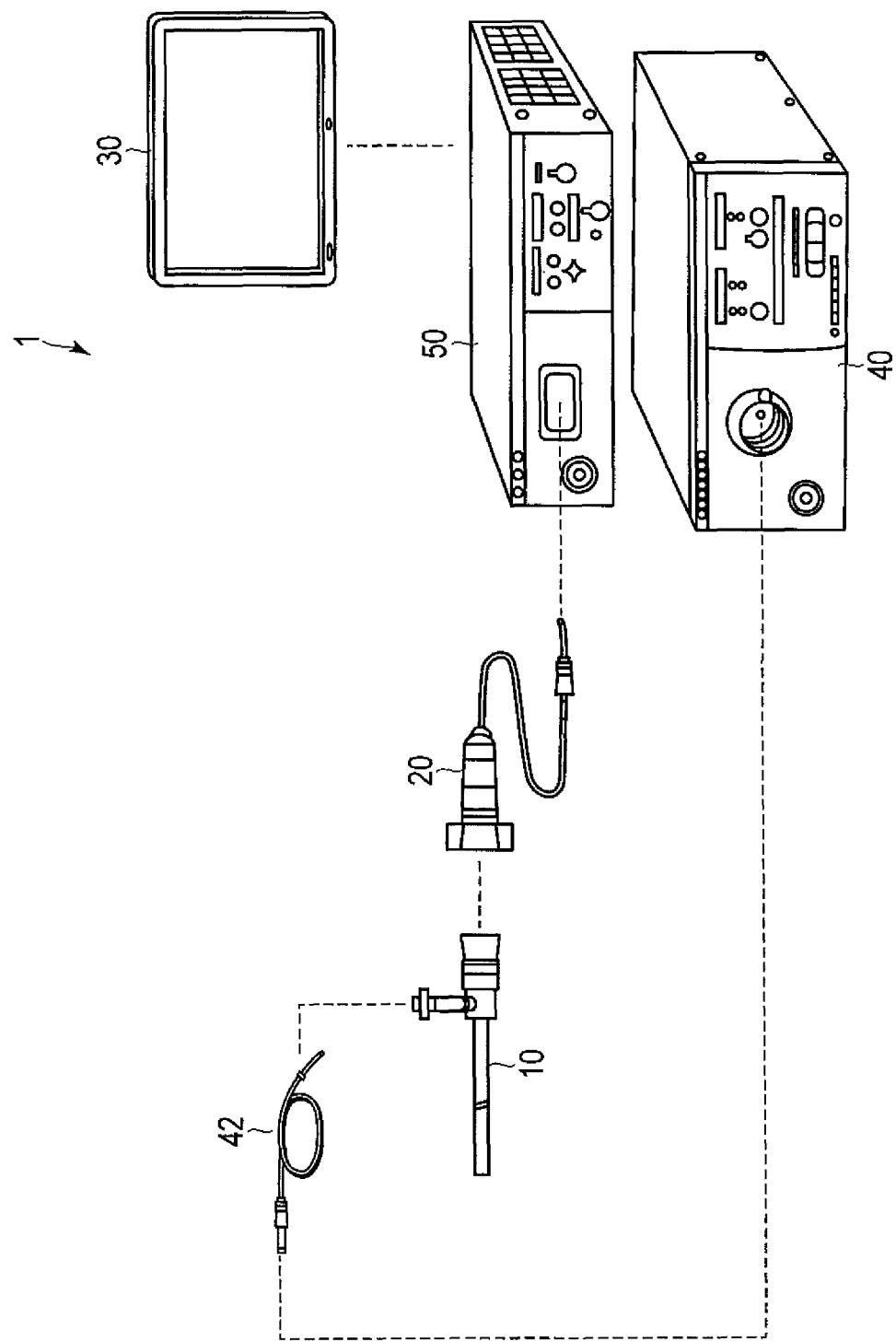
F I G. 1

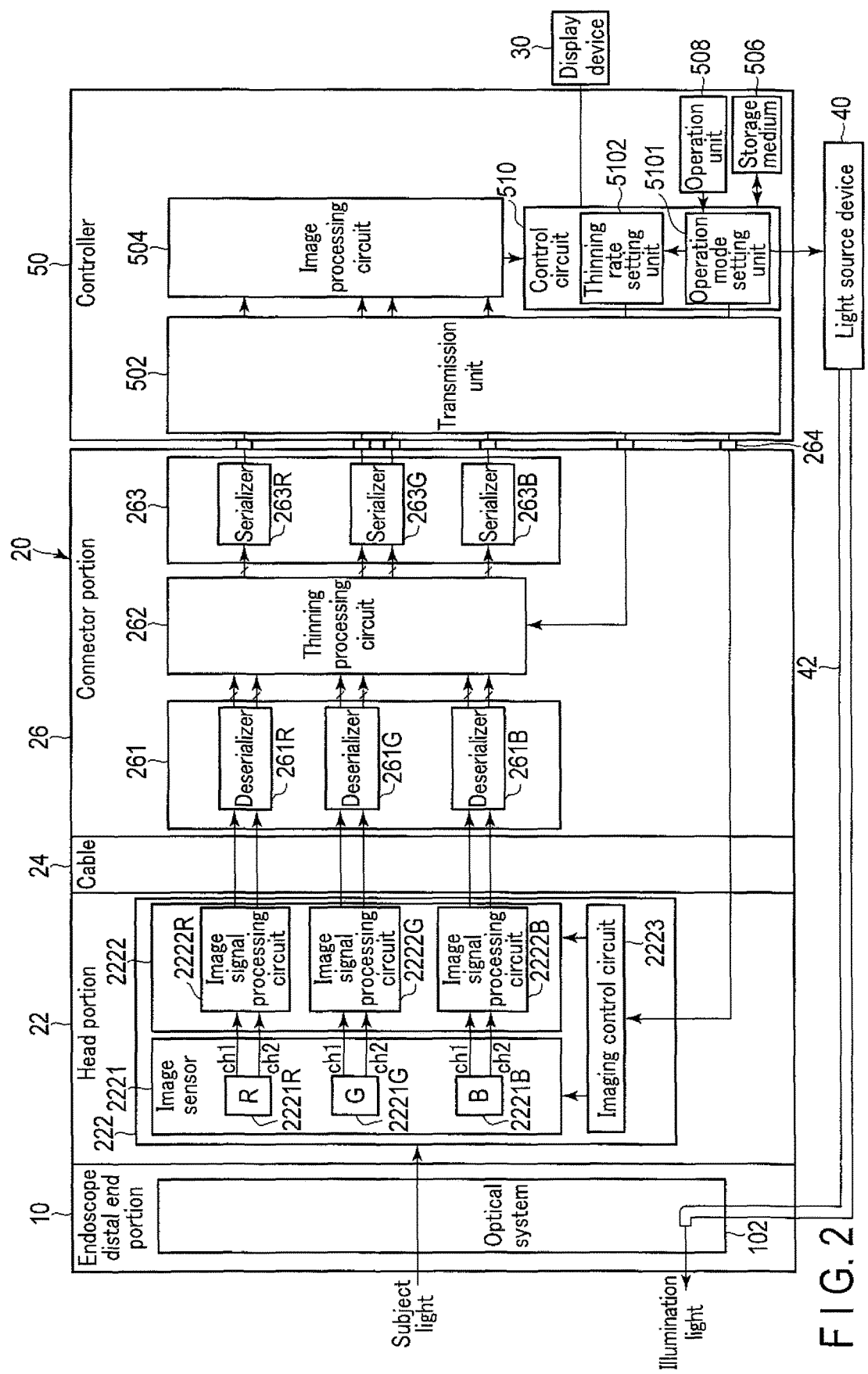
F I G. 2

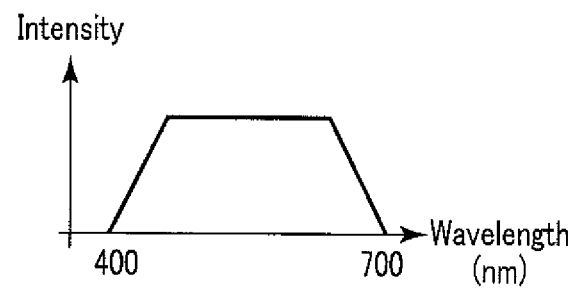
F I G. 3
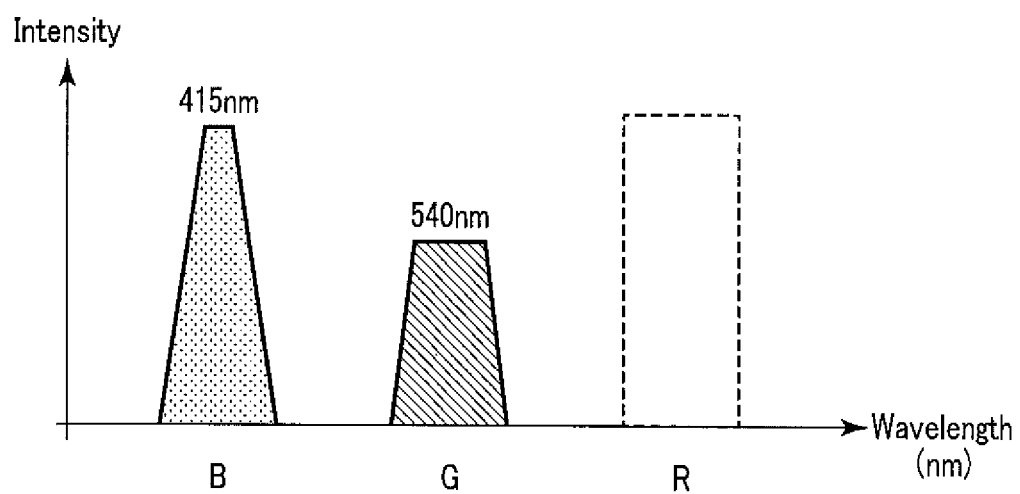
F I G. 4

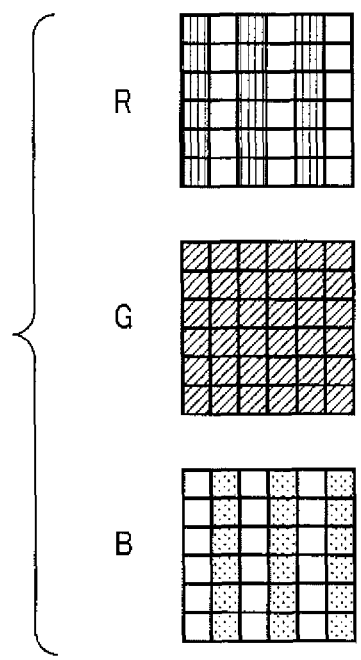
F I G. 5
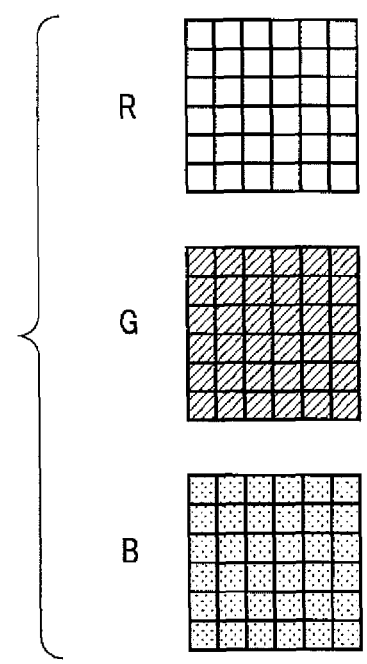
F I G. 6

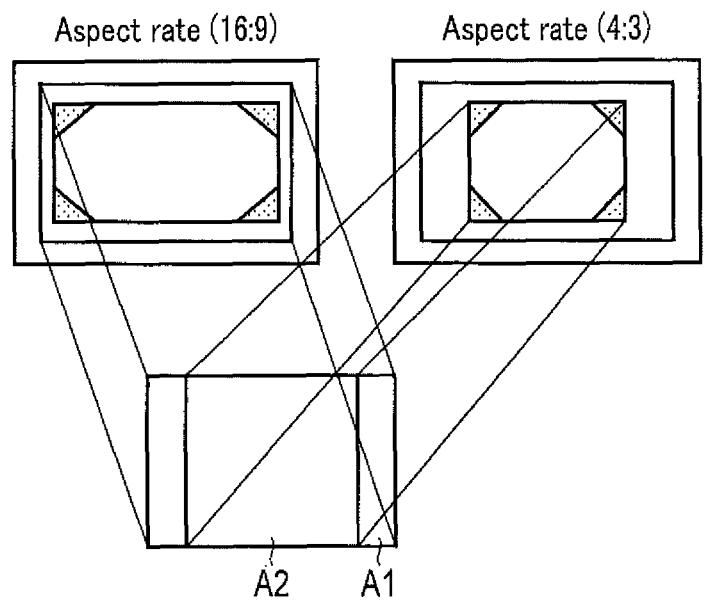
F I G. 11
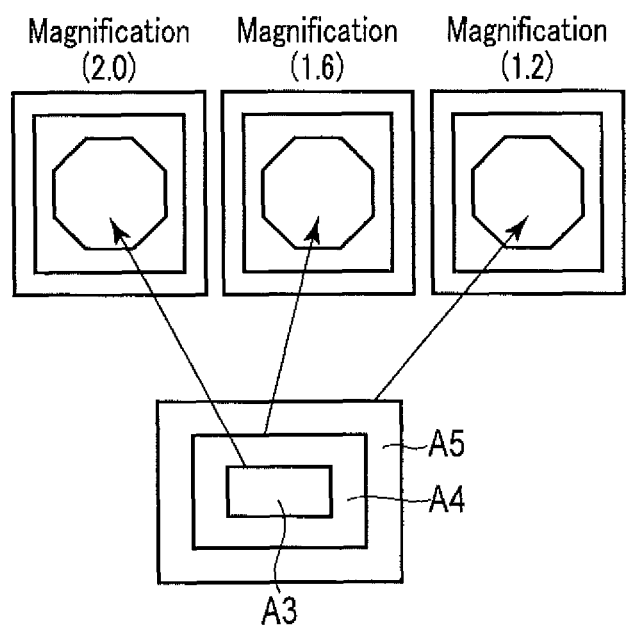
F I G. 12

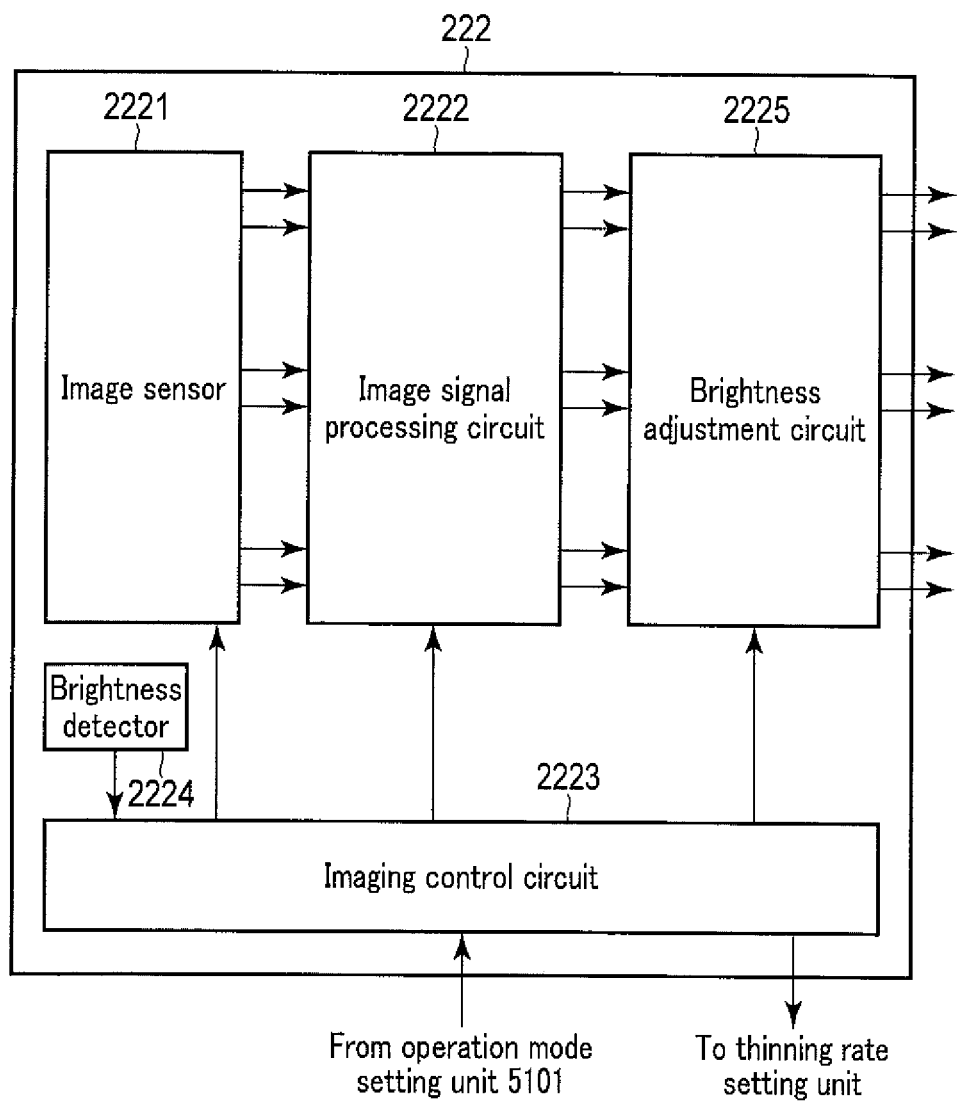
F I G. 13

| Brightness | Frame rate | Thinning rate | Transmission rate |
|---|---|---|---|
| Bright | 1/60 | 4X | Fixed |
| ↑ | 1/30 | 2X | |
| Dark | 1/15 | 1 | |

SOLID STATE IMAGING APPARATUS AND IMAGING METHOD

CROSS-REFERENCE TO RELATED APPLICATIONS

This application is a Continuation Application of PCT Application No. PCT/JP2015/066517, filed Jun. 8, 2015 and based upon and claiming the benefit of priority from the prior Japanese Patent Application No. 2014-122618, filed Jun. 13, 2014, the entire contents of both of which are incorporated herein by reference.

BACKGROUND OF THE INVENTION

1. Field of the Invention

The present invention relates to a solid state imaging apparatus and an imaging method using the same.

2. Description of the Related Art

Solid-state imaging apparatuses including image sensors that generate multiple pieces of image data each having information corresponding to different types of color components at the same pixel positions, such as a multi-plate type image sensor, have been known. It is likely that such an image sensor increases the data amount in comparison with a single-plate type image sensor. Accordingly, a thinning process, for example, is usually performed to image data obtained by the image sensor in order to reduce the data transmission band. For example, the imaging apparatus, described in Jpn. Pat. Appln. KOKAI Publication No. 2012-129927, thins part of image data obtained by a multi-plate type image sensor in the movie mode.

BRIEF SUMMARY OF THE INVENTION

A solid-state imaging apparatus according to a first aspect of the invention comprises: an imaging unit that images a subject to generate a plurality of pieces of image data having information corresponding to different types of color components at same pixel positions; an operation mode setting unit that sets an operation mode of the imaging unit; a thinning rate setting unit that sets a thinning rate relative to each of the plurality of pieces of image data of the different types of color components in accordance with the operation mode; a thinning processor that performs thinning processing relative to each of the plurality of pieces of image data of the different types of color components generated by the imaging unit in accordance with the thinning rate; and a transmission unit that transmits the plurality of pieces of image data of different types of color components that have been subjected to the thinning processing.

An imaging method according to a second aspect of the invention comprises: imaging a subject by an imaging unit and generating a plurality of pieces of image data having information corresponding to different types of color components at same pixel positions; setting an operation mode of the imaging unit; setting a thinning rate relative to each of the plurality of pieces of image data of the different types of color components in accordance with the operation mode; performing thinning processing relative to each of the plurality of pieces of image data of the different types of color components generated by the imaging unit in accordance with the thinning rate; and transmitting to an image processor the plurality of pieces of image data of different types of color components that have been subjected to the thinning processing.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 roughly illustrates the entire configuration of an endoscope system as an application example of a solid-state imaging apparatus according to one embodiment of the present invention;

FIG. 2 is a block diagram illustrating the configuration of the endoscope system;

FIG. 3 illustrates wavelength properties of an example white light;

FIG. 4 illustrates wavelength properties of an example special light;

FIG. 5 illustrates an example of a thinning process for a white light observing mode;

FIG. 6 illustrates an example of a thinning process for a special light observing mode;

FIG. 11 illustrates an example of a change in aspect ratio;

FIG. 12 illustrates an example of electronic zooming;

FIG. 13 illustrates the configuration of an imaging unit of variation example 6;

DETAILED DESCRIPTION OF THE INVENTION

Figure 7:
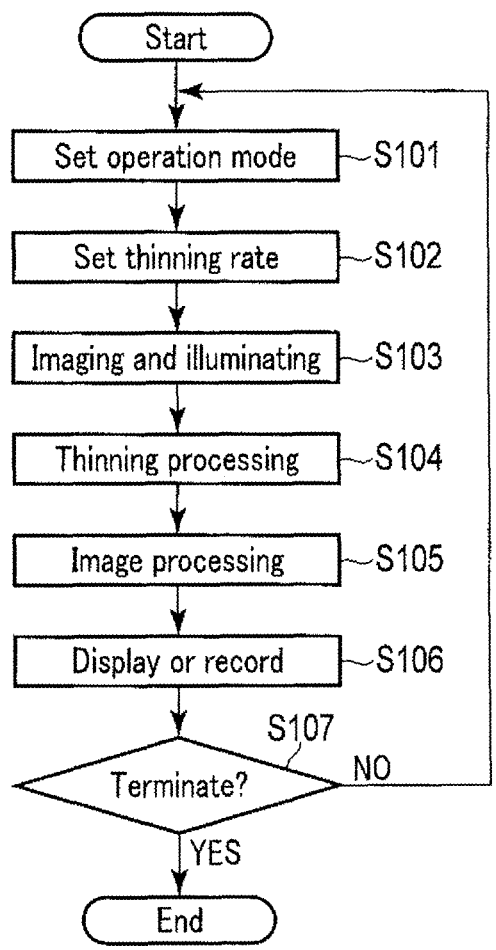
FIG. 7 is a flowchart illustrating the display processing or the movie recording processing of the endoscope system.

Hereinafter, embodiments of the present invention will be described with reference to the drawings. FIG. 1 roughly illustrates the entire configuration of an endoscope system as an application example of a solid-state imaging apparatus according to one embodiment of the present invention. FIG. 2 is a block diagram illustrating the configuration of the endoscope system. The technique according to the embodiment may be applied to various solid-state imaging apparatuses other than the endoscope system.

An endoscope system 1 includes an endoscope distal end portion 10, a camera head 20, a display device 30, a light source device 40, and a controller 50.

The endoscope distal end portion 10 includes an optical system 102. The optical system 102 includes various optical systems such as an image forming optical system and an emission optical system. The image forming optical system is an optical system in which an image is formed on an imaging surface of an image sensor of an imaging unit 222 provided to the camera head 20, by light (subject light) from a subject. The image forming optical system may be a scaling optical system. The emission optical system is an optical system in which illumination light applied to the endoscope distal end portion 10 from the light source device 40 is emitted toward the subject.

The camera head 20 generates image data of an inside of the subject by imaging the inside of the subject as an imaging subject. The camera head 20 includes a head portion 22, a cable 24, and a connector portion 26.

The head portion 22 includes the imaging unit 222. The imaging unit 222 converts light image-formed on the imaging surface through the image forming optical system of the optical system 102 into an electrical signal (image data) and outputs the electrical signal. The imaging unit 222 includes an image sensor 2221, an image signal processing circuit 2222, and an imaging control circuit 2223.

The image sensor 2221 includes pixels that convert applied light into an electrical signal. The pixels are arranged in two-dimensional pattern, for example. Each pixel is a photo diode, for example, and generates an analog electrical signal in accordance with the amount of applied light.

The image sensor 2221 in the embodiment is configured to generate a plurality of image signals each having information of different types of color components at the same pixel positions. For example, the image sensor 2221 shown in FIG. 2 includes a pixel region 2221R having a pixel that generates an image signal corresponding to light having red components from the subject; a pixel region 2221G having a pixel that generates an image signal corresponding to light having green components from the subject; and a pixel region 2221B having a pixel that generates an image signal corresponding to light having green components from the subject. The pixel regions 2221R, 2221G, and 2221E have the same pixel structure.

The image sensor 2221 having the above-indicated configuration may be a multi-plate type image sensor or a multi-layer image sensor, for example. The multi-plate type image sensor includes a plurality of image sensors that receive light of different types of color components from the subject. The multi-plate type image sensor includes an image sensor having only the pixel region 2221R that receives red components of light; an image sensor having only the pixel region 2221G that receives green components of light; and an image sensor having only the pixel region 2221B that receives blue components of light. If the image sensor 2221 is a multi-plate type image sensor, the optical system 102 is provided with a color separation optical system. The color separation optical system is an optical system that color-separates light from the subject so that respective types of color components of light from the subject are applied to the corresponding image sensors of the multi-plate type image sensor. The color separation optical system uses, for example, a dichroic prism. The image sensors corresponding to respective types of color components are provided at exits of color-separated light. The multi-layer type image sensor is formed by stacking multiple imaging layers that receive different types of color components of light from the subject. The multi-layer type image sensor includes a layer of the pixel region 2221R that receives red components of light; a layer of the pixel region 2221G that receives green components of light and allows red components of light to pass through; and a layer of the pixel region 2221B that receives blue components of light and allows red and green components of light to pass through that are stacked on one another. If the image sensor 2221 is a multi-layer image sensor, there is no need to provide a color separation optical system to the optical system 102.

In addition, each pixel region of the image sensor 2221 has a plurality of channels (channel ch1 and channel ch2 in FIG. 2) that output an image signal. The image signal generated at the pixel region is read though a channel by a predetermined amount (for example, one line per reading). In the example of FIG. 2, two lines of the image signal generated at each pixel region are read per turn. The structure of each pixel region having two channels reduces the transmission band to ½. The Dumber of channels is not limited to two.

The image signal processing circuit 2222 includes an image signal processing circuit 2222R compatible with an image signal input through ch1 and ch2 of the pixel region 2221R; an image signal processing circuit 2222G compatible with an image signal input through ch1 and ch2 of the pixel region 2221G; and an image signal processing circuit 2222B compatible with an image signal input through ch1 and ch2 of the pixel region 2221B. The image signal processing circuits 2222R, 2222G, and 2222B perform signal processing to the image signal generated at the image sensor 2221. For example, the image signal processing circuits 2222R, 2222G, and 2222B convert each image signal input through the corresponding channel into a digital image signal (R image data, G image data, or B image data). In addition, the image signal processing circuits 2222R, 2222G, and 2222B convert (serialize) image data into serial image data, for example. The serial image data is a differential serial data of low voltage differential signaling (LVDS) that includes serial data of R image data, G image data, or B image data, for example. In the following explanation, serial image data corresponding to R image data is referred to as serial R image data, serial image data corresponding to G image data is referred to as serial G image data, and serial image data corresponding to B image data is referred to as serial B image data.

The imaging control circuit 2223 inputs, to the image regions 2221R, 2221G, 2221B, and the image signal processing circuits 2222R, 2222G, and 2222B, a control signal to synchronize imaging of the pixel regions 2221R, 2221G, and 2221B of the image sensor 2221, and signal processing of the image signal processing circuit 2222 in accordance with the operation mode set at an operating mode setting unit 5101. In accordance with the control signal, reading of an image signal and imaging at the pixel regions 2221R, 2221G, and 2221B are controlled. In addition, the control signal is added to serial image data so that the serial image data is recovered at the controller 50.

The cable 24 connects the camera head 20 and the connector portion 26. The cable 24 is provided inside with various transmission lines such as a transmission line that transmits serial image data generated at the image signal processing circuits 2222R, 2222G and 2222B, and a transmission line that transmits a control signal from the controller 50.

The connector portion 26 includes a deserializer 261, a thinning processing circuit 262, a serializer 263, and a connector 264.

The deserializer 261 includes a deserializer 261R corresponding to the image signal processing circuit 2222R, a deserializer 261G corresponding to the image signal processing circuit 2222G, and a deserializer 261B corresponding to the image signal processing circuit 2222B. The deserializer 261R converts (deserializes) serial R image data of two channels transmitted from the image signal processing circuit 2222R into parallel R image data. The deserializer 261G converts (deserializes) serial G image data of two channels transmitted from the image signal processing circuit 2222G into parallel G image data. The deserializer 2612 converts (deserializes) serial B image data of two channels transmitted from the image signal processing circuit 2222B into parallel B image data.

The thinning processing circuit 262 performs thinning processing to parallel data transmitted from each of the deserializers 261R, 261G, and 2612. The thinning processing by the thinning processing circuit 262 is performed to each image data input to each channel, on the basis of a thinning rate determined at a thinning rate setting unit 5102. In the thinning processing, data of a greater amount of pixels is thinned as the thinning rate increases. For example, the thinning process is performed to reduce the output data amount to ½ if the thinning rate is ½. The thinning processing is actually performed by thinning data of pixels in a predetermined row from the input image data, for example. For example, if the thinning rate is ½, data in the odd-numbered rows or the even-numbered rows is thinned from the input image data. If the thinning rate is 1, data of all pixels is thinned. If the thinning rate is 0, no thinning is performed.

The thinning processing circuit 262 includes one output terminal for R image data, two output terminals for G image data, and one output terminal for B image data. Two output terminals are provided for G image data because the thinning processing is not performed to G image data in this embodiment. That is, two output terminals are provided for G image data in order to transmit G image data of two channels for which no thinning is performed. If the thinning processing is performed to G image data, only one output terminal for G image data may be sufficient.

The serializer 263 includes a serializer 263R corresponding to the image signal processing circuit 2222R, a serializer 2630 corresponding to the image signal processing circuit 2222G, and a serializer 263B corresponding to the image signal processing circuit 2222B. The serializer 263R converts (serializes) parallel R image data transmitted from the thinning processing circuit 262 into serial R image data. The serializer 263G converts parallel G image data transmitted from the thinning processing circuit 262 into serial G image data. The serializer 263B converts parallel B image data transmitted from the thinning processing circuit 262 into serial B image data.

The connector 264 is a connector that connects the camera head 20 to the controller 50 so that data can be transmitted to the controller 50. In the embodiment, the connector 264 includes one connector compatible with the transmission line that transmits serial R image data, two connectors compatible with the transmission lines that transmit serial G image data, and one connector compatible with the transmission line that transmits serial B image data.

The display device 30 displays an image of the subject based on display image data. The display device 30 is, for example, a liquid crystal monitor. A touch panel may be formed on the display screen of the display device 30.

The light source device 40 is connected to the endoscope distal end portion 10 through a light guide 42. The light source device 40 includes, for example, a plurality of LED light sources, and emits white light or special light through the light guide 42. FIG. 3 illustrates wavelength properties of an example white light. As shown in FIG. 3, white light has properties having a broad intensity to the wavelength in the visible wavelength range.

FIG. 4 illustrates wavelength properties of an example special light. As shown in FIG. 4, the special light is spectrum light having a peak around a particular wavelength. For example, the special light of the example shown in FIG. 4 is spectrum light having peaks around 415 nm and 540 nm. Such special light is used for observing a blood vessel, for example.

The controller 50 is connected to the camera head 20 through the connector 264 of the connector portion 26 so that data can be transmitted to the camera head 20. The controller 50 includes a transmission unit 502, an image processing circuit 504, a storage medium 506, an operation unit 508, and a control circuit 510. The controller 50 is divided into a patient circuit and a secondary circuit that are mutually insulated from each other. This structure prevents an electrical signal from directly flowing into the secondary circuit from the patient circuit, and prevents an electrical signal from directly flowing into the patient circuit from the secondary circuit. In FIG. 2, the image processing circuit 504, the storage medium 506, the operation unit 508 and the control circuit 510 are included in the secondary circuit.

The transmission unit 502 transmits data between the patient circuit and the secondary circuit. The transmission unit 502 includes the same number of pulse transformers as that of the connectors 264.

The image processing circuit 504 restores the image data from the serial image data transmitted from the transmission unit 502, and performs image processing to the restored image data. The image processing circuit 504 performs interpolation processing so that the pixel arrangements become the same for the R image data, G image data, and B image data, for example, as imaging processing. The interpolation processing is performed to interpolate data of pixels in which the thinning processing has been performed by using the data of neighboring pixels, for example.

In addition, the image processing circuit 504 performs processing to generate display image data or recording image data by performing gamma correction, or the like. The display image data is image data used to display an image of the subject on the display device 30, the recording image data is image data to be stored in the storage medium 506.

The image processing circuit 504 performs processing for changing the aspect ratio of the display image data or recording image data, for electronic zooming of the display image data or recording image data, and for masking portions where a peripheral light amount is reduced in display image data or recording image data, if required.

The storage medium 506 stores recording image data obtained by the image processing circuit 504. The operation unit 508 is an operation unit through which a user such as a doctor performs various operations relative to the controller 50 of the endoscope system 1. The operation unit 508 includes an operation unit for selecting an operation mode of the endoscope system 1, and an operation unit for turning on or off the power supply of the endoscope system 1, for example.

The control circuit 510 includes, for example, a CPU and a memory. The control circuit 510 controls the entire operation of the endoscope system including the operation of the controller 50. For example, the control circuit 510 controls the operations of the imaging unit 222, the display device 30, and the light source device 40. The control circuit 510 allows the storage medium 506 to store recording image data generated at the image processing circuit 504.

The control circuit 510 includes an operation mode setting unit 5101 and a thinning rate setting unit 5102. The operation mode setting unit 5101 sets the operation mode of the endoscope system 1, and inputs information of the set operation mode to the imaging control circuit 2223 and to the light source device 40. In this embodiment, the operation mode of the endoscope system 1 includes a white light observing mode and a special light observing mode. The white light observing mode is an operation mode where white light is applied to the subject to observe the subject. The special light observing mode is an operation mode where special light is applied to the subject to observe the subject.

The thinning rate setting unit 5102 sets the thinning rate used at the thinning processing circuit 262 in accordance with the operation mode set at the operation mode setting unit 5101. The thinning rate is determined in accordance with the degree of influence of the image to be thinned relative to the quality of the display image data or the recording image data. The thinning rate setting unit 5102 also sets a position of a pixel for which the thinning processing is performed by the thinning processing circuit 262.

In the white light observing mode, light including each of R components, G components, and B components is applied to the subject, and accordingly, the captured image data may include any of R, G, and B components. However, G image data has the greatest influence on the image quality of the display image data or recording image data. If G image data is thinned, the image quality is greatly degraded. Accordingly, in the white light observing mode, the thinning processing is not performed on G image data, but is performed on R image data and B image data. The thinning rate setting unit 5102, for example, sets the thinning rate to the R image data and B image data to ½, and sets the thinning rate to the G image data to zero. The thinning rate setting unit 5102 sets pixels in the even-numbered columns as pixels to be thinned for the R image data, and sets pixels in the odd-numbered columns as pixels to be thinned for the B image data. By this setting, the thinning processing circuit 262 thins data of pixels in the even-numbered columns in the R image data, and thins data of pixels in the odd-numbered columns in the B image data, as shown in FIG. 5. In the example shown in FIG. 5, the different columns are set to be thinned in the R image data and the B image data. This setting can improve the accuracy of interpolation processing.

In the special light observing mode, light each including G components and B components is applied to the subject, and accordingly, the captured image data hardly includes any R components. That is, the R image data has almost no influence on the quality of the display image data or the recording image data. However, the G image data and the B image data have a significant influence on the quality of the display image data or the recording image data. Accordingly, in the special light observing mode, the thinning processing is not performed on G image data or B image data, but all the R image data is thinned. The thinning rate setting unit 5102, for example, sets the thinning rate to the R image data to 1, and sets the thinning rate to the G image data and the B image data to zero. By this setting, the thinning processing circuit 262 thins all the pixels of the R image data, as shown in FIG. 6.

Figure 8:
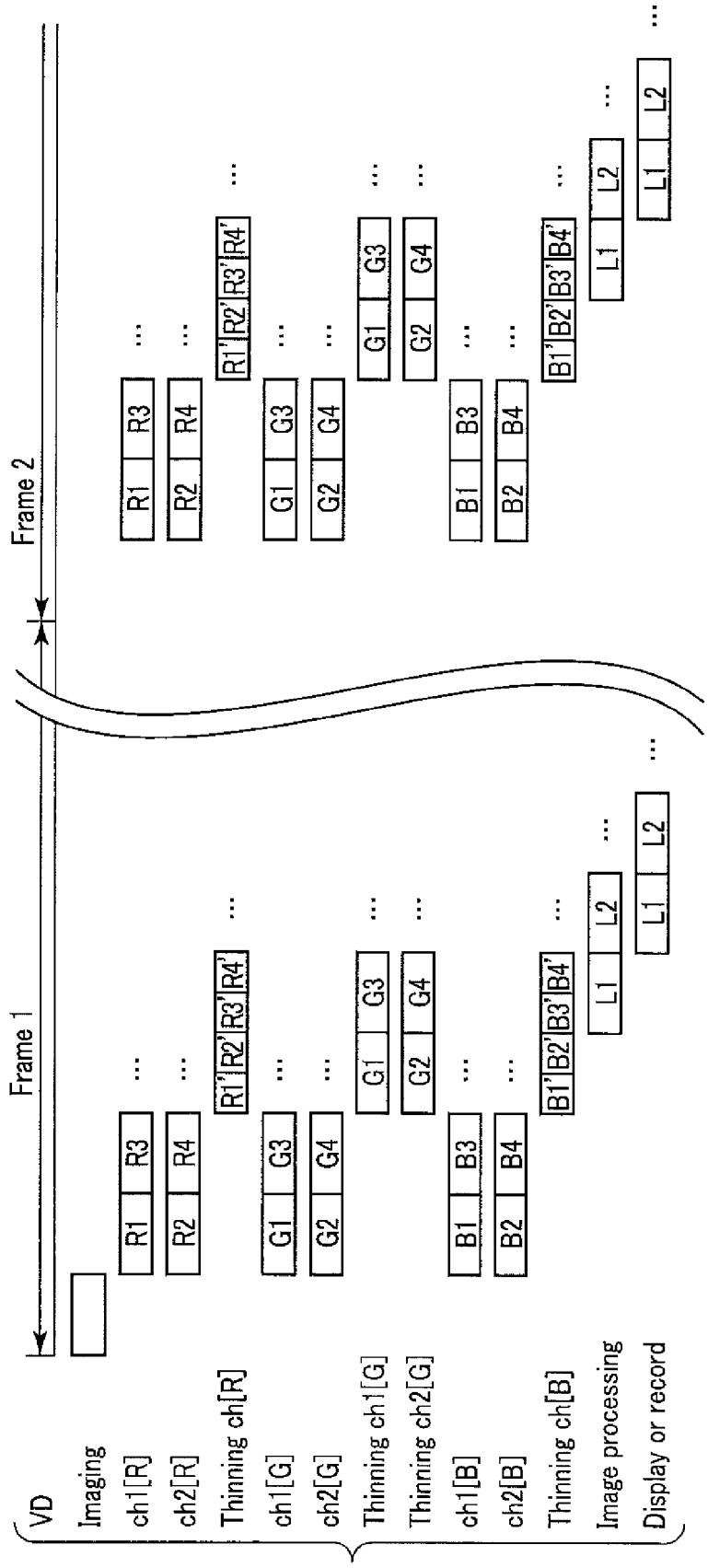
FIG. 8 is a timing chart illustrating the display processing or the movie recording processing of the endoscope system in the white light observing mode.
Figure 9:
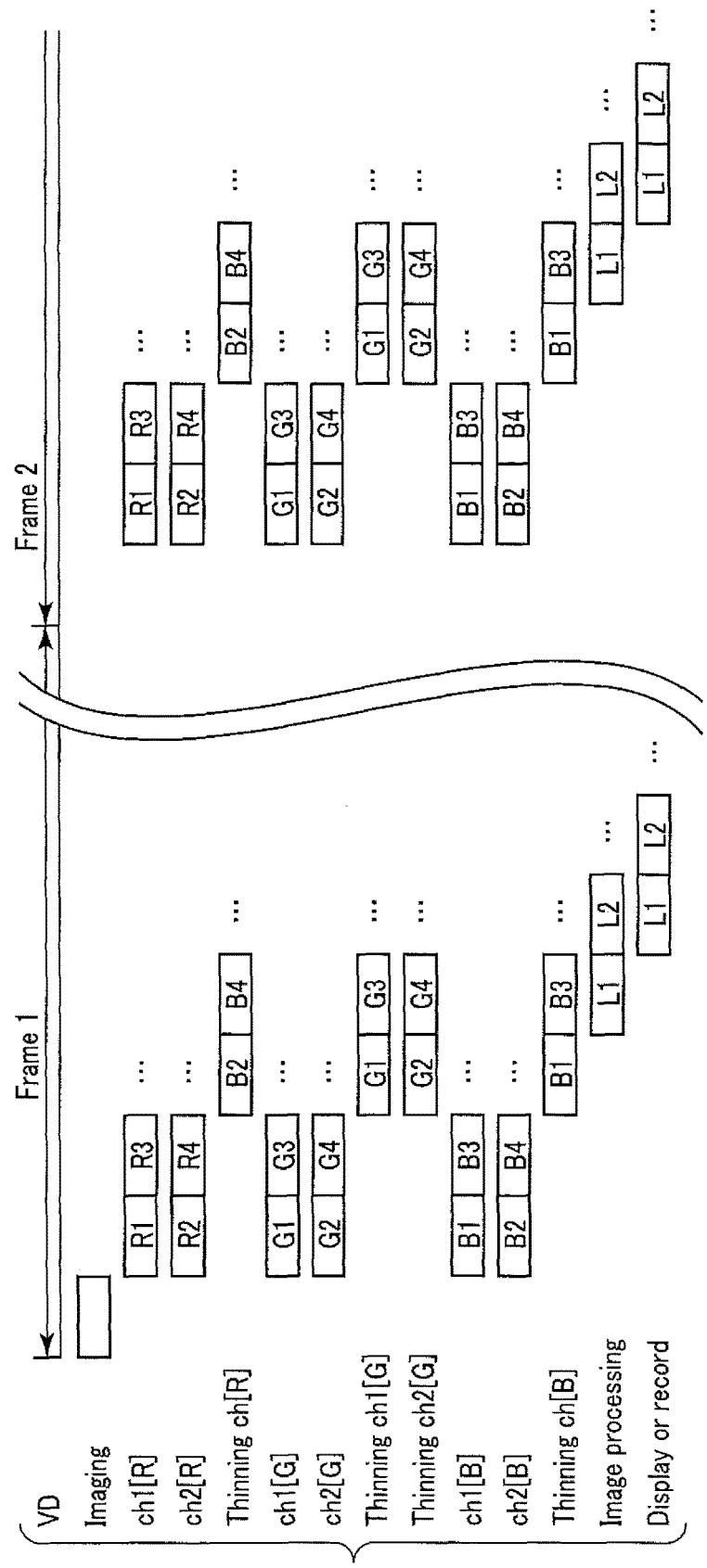
FIG. 9 is a timing chart illustrating the display processing or the movie recording processing of the endoscope system in the special light observing mode.

The operation of the endoscope system 1 of the present embodiment will be explained as an example of the solid-state imaging apparatus below. FIG. 7 is a flowchart illustrating the display processing or the movie recording processing of the endoscope system 1. The operation shown in FIG. 7 is controlled by the controller 510. FIGS. 8 and 9 each show a timing chart in accordance with the operation shown in FIG. 7. FIG. 8 shows a timing chart in the white light observing mode, and FIG. 9 shows a timing chart in the special light observing mode. FIGS. 8 and 9 show from the top of the charts the timings of a control signal VD to be input to the imaging control circuit 2223, imaging, ch 1 [R] which is an output of ch 1 in the pixel region R, ch 2 [R] which is an output of ch 2 in the pixel region R, thinning ch [R] which is an output of the output terminal for R image data in the thinning processing circuit 262, ch 1 [G] which is an output of ch 1 in the pixel region G, ch 2 [G] which is an output of ch 2 in the pixel region G, thinning ch 1 [G] and thinning ch 2 [G] each of which is an output of the output terminal for G image data in the thinning processing circuit 262, ch 1 [B] which is an output of ch 1 in the pixel region B, ch 2 [B] which is an output of ch 2 in the pixel region B, thinning ch [B] which is an output of the output terminal for B image data in the thinning processing circuit 262, image processing, and display (recording).

The processing shown in FIG. 7 is initiated when the power supply of the endoscope system 1 is turned on by the operation of the operation unit 508, for example. In step S101, the control circuit 510 sets the operation mode of the endoscope system 1 by the operation mode setting unit 5101. The operation mode is basically the same as the mode set when previously executing step S101. If the user operates the operation unit 508, the operation mode is changed.

In step S102, the control circuit 510 sets the thinning rate by the thinning rate setting unit 5102. The thinning rate setting unit 5102 sets the thinning rate to the R image data and B image data to ½, and sets the thinning rate to the G image data to zero if the operation mode is the white light observing mode. In addition, the thinning rate setting unit 5102 sets pixels in the even-numbered columns as pixels to be thinned for the R image data, and sets pixels in the odd-numbered columns as pixels to be thinned for the B image data. On the other hand, the thinning rate setting unit 5102 sets the thinning rate to the R image data to 1, and sets the thinning rate to the G image data and the B image data to zero if the operation mode is the special light observing mode.

In step S103, the control circuit 510 transmits a control signal to the imaging control circuit 2223 to allow the imaging unit 222 to start imaging. Upon reception of the control signal, the imaging control circuit 2223 allows the image sensor 2221 to start imaging in the pixel regions 2221R, 2221G, and 2221B at a predetermined imaging frame rate. The control circuit 510 transmits a control signal to the light source device 40 to emit light by being synchronized with the imaging by the imaging unit 222. Upon reception of the control signal, the light source device 40 emits illumination light in accordance with the operation mode. The image signal generated by imaging is read for each pixel row, for example. As shown in FIGS. 8 and 9, image signals R1, R3, etc., image signals G1, G3, etc., image signals B1, B3, etc. of odd-numbered rows (row 1, row 3, etc.) are read from ch 1 of each pixel region, and image signals R2, R4, etc., image signals G2, G4, etc., image signals B2, B4, etc. of even-numbered rows (row 2, row 4, etc.) are read from ch 2 of each pixel region. The image signals are converted to serial image data, and transmitted through the cable 24. The serial image data is converted to parallel image data at the deserializer 261, and input to the thinning processing circuit 262.

In step S104, the thinning processing circuit 262 performs thinning processing to the input image data in accordance with the thinning rate.

In the white light observing mode, the thinning processing circuit 262 performs the thinning processing so that the data amount (the number of pixels) of the R image data and the B image data is reduced to ½. The thinning processing circuit 262 does not perform the thinning processing to the G image data. As a result, R image data R1', R2', R3', R4', etc. in which pixel data in the even-numbered columns is thinned is generated from the R image data R1, R2, R3, R4, etc. Similarly, B image data B1', B2', B3'', B4', etc. in which pixel data in the odd-numbered columns is thinned is generated from the B image data B1, B2, B3, B4, etc. Applying the thinning processing, the data amount of the R image data and the B image data is ½. Accordingly, the R image data and the B image data of two rows can be transferred while the G image data of one row is transferred, as shown in FIG. 8. By this processing, suitable data transmission is realized even if only one output terminal for the R image data and one output terminal for the B image data are provided.

In the special light observing mode, the thinning processing circuit 262 performs the thinning processing so that all the R image data is thinned. The thinning processing circuit 262 does not perform the thinning processing on the G image data or the B image data. Since no thinning processing is performed on the B image data, suitable data transmission is not realized if B image data is transmitted from only one output terminal. Accordingly, part of the B image data (for example, B image data from ch 2) is output from the output terminal for the R image data, as shown in FIG. 9 By this processing, suitable data transmission is realized even if only one output terminal for the R image data and one output terminal for the B image data are provided.

In step S105, the image processing circuit 504 performs interpolation processing so that the pixel arrangements are the same for the R image data, G image data, and B image data. In addition, the image processing circuit 504 performs the image processing required for display or recording to generate display image data or recording image data L1, L2, L3, etc.

In step S106, the control circuit 510 inputs the display image data generated at the image processing circuit 504 to the display device 30. The display device 30 displays an image of the subject based on the input display image data L1, L2, L3, etc. The display device 30 displays a real-time image of the inside of the subject's body. The control circuit 510 allows the storage medium 506 to store recording image data L1, L2, L3, etc. generated at the image processing circuit 504. By the above processing, the display processing or the movie processing for one frame is completed.

In step S107, the control circuit 510 determines whether or not to terminate the operation of the endoscope system 1. For example, if the power supply of the endoscope system 1 is turned off, the control circuit 510 determines to terminate the operation of the endoscope system 1. In step S107, if it is determined not to terminate the operation of the endoscope system 1, the processing is returned to step S101. In step S107, if it is determined to terminate the operation of the endoscope apparatus 1, the operation shown in FIG. 7 is terminated.

As explained above, according to the embodiment, the thinning rate of image data for each type of color component is set in accordance with the operation mode of the solid-state imaging apparatus containing image sensors configured to generate a plurality of image signals having information of different types of color components at the same pixel positions, and the thinning processing is performed to the image data for each type of color components, based on the thinning rate. This processing suppresses the degradation of quality of the display image data or the recording image data, and also reduces the data amount of the image data. Therefore, data transfer is accomplished even if the number of connectors is reduced. In addition, data can be easily transmitted even by a transmission unit having low transmission band such as a pulse transformer.

The variation example of the embodiment will be explained below.

Variation Example 1

In the aforementioned embodiment, the thinning rate differs between the white light observing mode and the special light observing mode. However, the technique of the embodiment may be applied to the other operation modes. For example, in the infrared rays motoring mode where the subject is observed while infrared rays are applied, R image data has a significant influence on the quality of the display image data or the recording image data. Accordingly, in the infrared rays observing mode, the thinning rate for B image data is set to be greater than the thinning rate for R image data and G image data.

Variation Example 2

In the aforementioned embodiment, in the special light observing mode, all the pixels of the R image data are thinned. In this case, it may be possible to not read an image signal, instead of thinning all the pixel data.

Variation Example 3

In the aforementioned embodiment, the thinning processing circuit 262 performs the thinning processing on the image data from ch1 and the image data from ch2 at the same thinning rate. On the other hand, it may be possible to apply the different thinning rates when performing the thinning processing to the image data from ch1 and the image data from ch2. For example, if an image is displayed on the display device 30 which is compatible with interlaced display, or if interlaced recording is performed, the different thinning rates may be applied to the image data from ch1 and ch2 so that the image data of the corresponding field remains.

Figure 10:
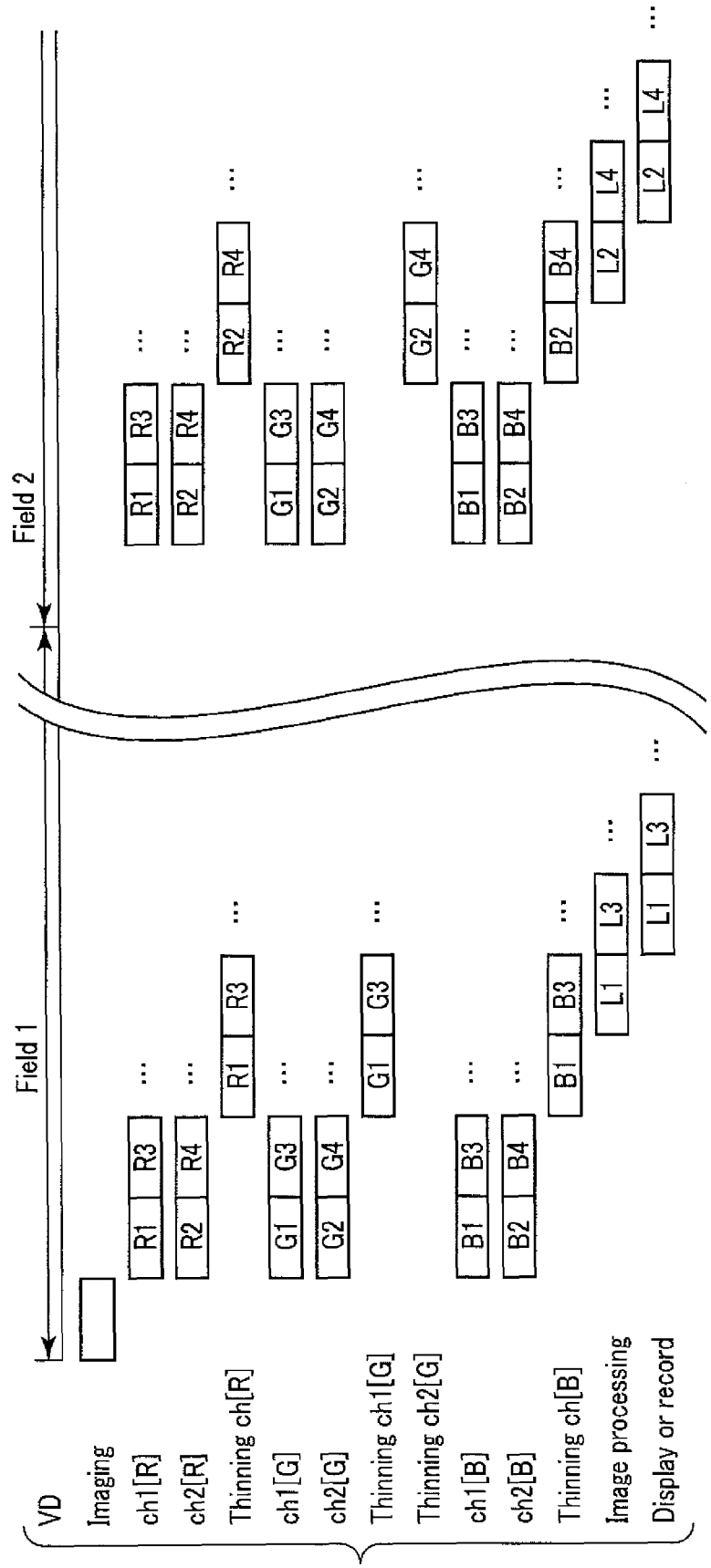
FIG. 10 is a timing chart illustrating the interlaced display processing or the interlaced recording processing of the endoscope system in the white light observing mode.

FIG. 10 is a timing chart illustrating the interlaced display processing or the interlaced recording processing of the endoscope system 1 in the white light observing mode. FIG. 10 is a timing chart for the case where one frame is divided into two fields for being displayed or recorded. An instruction for interlaced display or interlaced recording is made by the operation through the operation unit 508, for example. The frame may be divided into any number of fields.

In the variation example 3, the thinning rate setting unit 5102 sets the thinning rate for R image data, G image data, and B image data to ½, and sets the even-numbered rows to be thinned for odd-numbered fields (field 1). On the other hand, the thinning rate setting unit 5102 sets the thinning rate for R image data, G image data, and B image data to ½, and sets the odd-numbered rows to be thinned for even-numbered fields (field 2). In accordance with this setting, the thinning processing circuit 262 thins the even-numbered rows of R image data (R2, R4, etc.), G image data (G2, G4, etc.) and B image data (B2, B4, etc.) for the odd-numbered fields (field 1), and thins the odd-numbered rows of R image data (R1, R3, etc.) G image data (G1, G3, etc.), and B image data (B1, B3, etc.) for the even-numbered fields (field 2), as shown in FIG. 10. Accordingly, the image of the subject is displayed based on the display image data L1, L3, etc., or the recording image data L1, L3, etc. is stored in the storage medium 506, in the field 1. In addition, the image of the subject is displayed based on the display image data L2, L4, etc., and the recording image data L2, L4, etc. is stored in the storage medium 506, in the field 2.

As stated above, in the variation example 3, the thinning processing is performed in accordance with display or recording to increase efficiency. FIG. 10 is an example of the white light observing mode. In the special light observing mode data of all the pixels of the R image data is thinned in both odd-numbered fields and the even-numbered fields.

Variation Example 4

As stated above, the image processing circuit 504 changes the aspect ratio relative to the image data if necessary. For example, if the aspect ratio of pixels forming the image sensor 2221 is 16:9, and the aspect ratio of the display device 30 is 4:3, it is necessary to change the aspect ratio of the display image data from 16:9 to 4:3. FIG. 11 illustrates an example of a change in aspect ratio. In an example of an aspect ratio change, the display image data A2 having the aspect ratio of 4:3 is extracted from the display image data A1 having the aspect ratio of 16:9. In this case, portions other than the display image data A2 are discarded as unnecessary data. If the thinning rate setting unit 5102 sets the thinning rate so that the unnecessary data is thinned by the thinning processing circuit 262, it is possible to eliminate the need for changing the aspect ratio at the image processing circuit 504.

Variation Example 5

As stated above, the image processing circuit 504 performs electronic zooming to the image data if necessary. FIG. 12 illustrates an example of electronic zooming. In an example of electronic zooming, part of the display image data or the recording image data is extracted in accordance with the magnification of electronic zooming, and the extracted display image data or recording image data is enlarged to a predetermined size. For example, if the magnification is 1.2, the display image data or recording image data A5 is extracted. If the magnification is 1.6, the display image data or recording image data A4, the range of which is narrower than the display image data or recording image data A5, is extracted. If the magnification is 2.0, the display image data or recording image data A3 the range of which is narrower than the display image data or recording image data A4 is extracted. In any cases, portions other than the extracted display image data or recording image data are discarded as unnecessary data. If the thinning rate setting unit 5102 sets the thinning rate so that the unnecessary data is thinned by the thinning processing circuit 262, the image processing circuit 504 only needs to perform enlargement processing.

Variation Example 6

In general, the imaging frame rate of the image sensor is preferably adjusted by the brightness of the captured image data. That is, if dark image data is obtained, it is preferable to increase the exposure time in order to obtain brighter image data. In this case, it is necessary to lower the imaging frame rate. On the other hand, if brighter image data is obtained, it is not necessary to increase the exposure time.

In order to perform display by the display device 30 with a fixed display frame rate, it is necessary to transmit the captured image data with the same transmission rate regardless of the imaging frame rate. That is, if the imaging frame rate is high, the image data is transmitted at short intervals. In this case, high-speed data transmission is accomplished by increasing the thinning rate. On the other hand, if the imaging frame rate is low, the thinning rate is decreased.

The variation example 6 will be explained in detail. FIG. 13 illustrates the configuration of the imaging unit 222 in variation example 6. The same structures as explained with reference to FIG. 2 are indicated with the same reference numerals, and the explanations thereof will be omitted. The imaging unit 222 in variation example 6 includes a brightness detector 2224 and a brightness adjustment circuit 2225, in addition to the elements shown in FIG. 2.

The brightness detector 2224 is a brightness sensor such as a photo diode, and is provided in the vicinity of the image sensor 2221. The brightness detector 2224 detects the brightness of the subject as a subject to be imaged, and outputs the detected brightness information to the imaging control circuit 2223.

The brightness adjustment circuit 2225 performs brightness adjustment to the image data (R image data, G image data, and B image data) obtained at the image signal processing circuit 2222. The brightness adjustment is performed, for example, by gain adjustment.

Figures 14, 15:
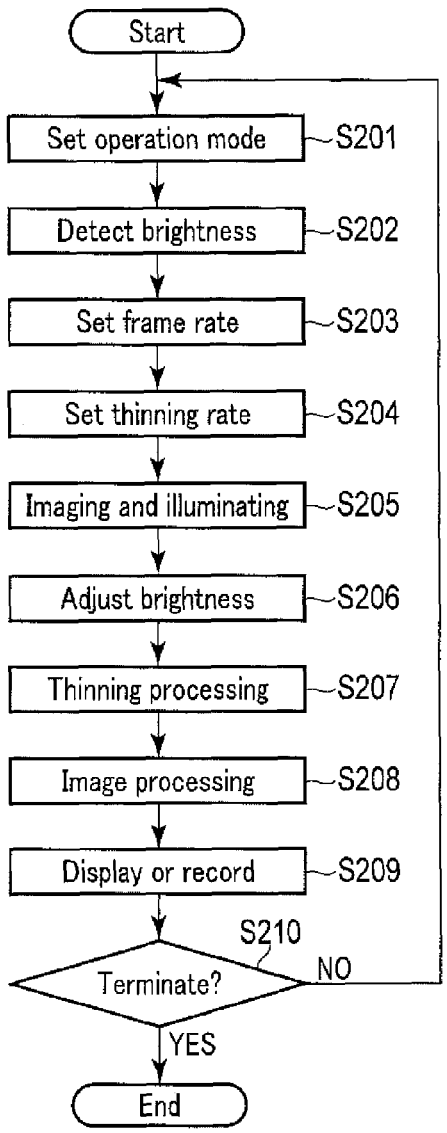
FIG. 14 is a flowchart illustrating the display processing or the movie recording processing of the endoscope system of variation example 6.
FIG. 15 illustrates the relationship between brightness, imaging frame rate, and thinning rate.

FIG. 14 is a flowchart illustrating the display processing or the movie recording processing of the endoscope system 1 in variation example 6. In the following explanation, the operations similar to those shown in FIG. 7 will be simplified.

In step S201, the control circuit 510 sets the operation mode of the endoscope system 1 by the operation mode setting unit 5101. The setting of the operation mode is the same as that shown in FIG. 7.

In step S202, the imaging control circuit 2223 detects the brightness of the subject by the brightness detector 2224. The imaging control circuit 2223 transmits the detected brightness information to the thinning rate setting unit 5102.

In step S203, the imaging control circuit 2223 sets the imaging frame rate. FIG. 15 illustrates the relationship between brightness, imaging frame rate, and thinning rate. As shown in FIG. 15, if the subject is bright, the imaging frame rate is increased (for example, $\frac{1}{60}$ of the standard rate). If the subject is dark, the imaging frame rate is decreased (for example, $\frac{1}{15}$ of the standard).

In step S204, the control circuit 510 sets the thinning rate by the thinning rate setting unit 5102. First, the thinning rate setting unit 5102 sets the thinning rate in accordance with the operation mode. The thinning rate setting unit 5102 then changes the thinning rate in accordance with the imaging frame rate, as shown in FIG. 15. For example, if the imaging frame rate is $\frac{1}{15}$, the thinning rate set in accordance with the operation mode is adopted. If the imaging frame rate becomes $\frac{1}{2}$, the thinning rate is set to be doubled. The thinning rate is set between 0 to 1. Accordingly, it is preferable that a factor is set to adjust the thinning rate in accordance with the imaging frame rate so that the thinning rate does not fall below 0 or rise above 1, as a result of change in accordance with the imaging frame rate.

In step S205, the control circuit 510 transmits a control signal to the imaging control circuit 2223 to allow the imaging unit 222 to start imaging. Upon reception of the control signal, the imaging control circuit 2223 allows the image sensor 2221 to start imaging in the pixel regions 2221R, 2221G, and 2221B at a predetermined imaging frame rate. The control circuit 510 transmits a control signal to the light source device 40 to emit light by being synchronized with the imaging by the imaging unit 222. Upon reception of the control signal, the light source device 40 emits illumination light in accordance with the operation mode.

In step S206, the brightness adjustment circuit 2225 performs brightness adjustment on the image data. The subsequent steps S207 to S210 are similar to the steps S104 to S107, and the explanation thereof will be omitted.

In variation example 6, a fixed transmission rate can be maintained by changing the thinning rate in accordance with the imaging frame rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging apparatus comprising:
   an imaging unit that images a subject to generate a plurality of pieces of image data having information corresponding to different types of color components at same pixel positions;
   an operation mode setting unit that sets an operation mode of the imaging unit;
   a thinning rate setting unit that sets a thinning rate relative to each of the plurality of pieces of image data of the different types of color components in accordance with the operation mode;
   a thinning processor that performs thinning processing relative to each of the plurality of pieces of image data of the different types of color components generated by the imaging unit in accordance with the thinning rate; and
   a transmission unit that includes a plurality of transmission channels through which each of the plurality of pieces of image data of different types of color components are individually transmitted, and transmits part of image data of a type of color components for which the thinning rate is low by using a transmission channel used for image data of a type of color components for which the thinning rate is high.

2. The solid-state imaging apparatus according to claim 1, further comprising an illumination unit that irradiates the subject with white light or special light,
   wherein the operation mode of the imaging unit includes a white light imaging mode in which the subject irradiated with the white light is imaged, and a special light imaging mode in which the subject irradiated with the special light is imaged, and
   the thinning rate setting unit sets the thinning rate for image data of a type of color components corresponding to light not used as the special light to be greater than the thinning rate for image data of a type of color components corresponding to light used as the special light in the special light imaging mode.

3. The solid-state imaging apparatus according to claim 1, further comprising:
   an image processor that generates display image data from the plurality of pieces of image data; and
   a display unit that displays an image for the subject based on the display image data by an interlace system,
   wherein the thinning rate setting unit sets the thinning rate so that image data corresponding to a display field based on the interlace system remains.

4. The solid-state imaging apparatus according to claim 1, further comprising an image processor that generates display image data or recording image data from the plurality of pieces of image data,
   wherein the thinning rate setting unit sets the thinning rate in accordance with an aspect ratio of the display image data or the recording image data.

5. The solid-state imaging apparatus according to claim 1, further comprising an image processor that generates display image data or recording image data from the plurality of pieces of image data, and performs electronic zooming to the generated display image data or recording image data,
   wherein the thinning rate setting unit sets the thinning rate in accordance with a magnification of the electronic zooming.

6. The solid-state imaging apparatus according to claim 1, further comprising a brightness detector that detects brightness of the subject,
   wherein the thinning rate setting unit sets the thinning rate based on a frame rate at the imaging unit and the brightness of the subject detected by the brightness detector.

7. An imaging method comprising:
   imaging a subject by an imaging unit and generating a plurality of pieces of image data having information corresponding to different types of color components at same pixel positions;
   setting an operation mode of the imaging unit;
   setting a thinning rate relative to each of the plurality of pieces of image data of the different types of color components in accordance with the operation mode;
   performing thinning processing relative to each of the plurality of pieces of image data of the different types of color components generated by the imaging unit in accordance with the thinning rate; and
   transmitting to an image processor part of image data of a type of color components for which the thinning rate is low by using a transmission channel used for image data of a type of color components for Which the thinning rate is high among a plurality of transmission channels through which each of the plurality of pieces of image data of different types of color components are individually transmitted.

* * * * *